United States Patent
Uchigaki

[19]

[11] Patent Number: 6,138,073
[45] Date of Patent: *Oct. 24, 2000

[54] METHOD OF NAVIGATING USING POSITION-INFORMATION-CODES WHICH INCLUDE INFORMATION REGARDING THE LATITUDE AND LONGITUDE OF A DESIRED LOCATION

[75] Inventor: Yuichiro Uchigaki, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/951,452

[22] Filed: Oct. 16, 1997

[30] Foreign Application Priority Data

Jun. 24, 1997 [JP] Japan ................................. 9-167772

[51] Int. Cl.⁷ .......................... G01C 21/36; G08G 1/0968
[52] U.S. Cl. ............................. 701/208; 701/211
[58] Field of Search ................... 701/201, 202, 701/207, 211, 240, 208, 35; 340/990, 995

[56] References Cited

U.S. PATENT DOCUMENTS

| | | | |
|---|---|---|---|
| 4,827,420 | 5/1989 | Musa | 701/200 |
| 4,862,374 | 8/1989 | Ziemann | 701/207 |
| 5,067,081 | 11/1991 | Person | 701/201 |
| 5,422,814 | 6/1995 | Sprague | 701/207 |
| 5,515,284 | 5/1996 | Abe | 701/201 |
| 5,544,061 | 8/1996 | Morimoto et al. | 701/201 |
| 5,774,362 | 6/1998 | Suzuki et al. | 701/200 |

FOREIGN PATENT DOCUMENTS 5-53503  3/1993  Japan .

Primary Examiner—Tan Nguyen
Attorney, Agent, or Firm—Sughrue, Mion, Zinn, Macpeak & Seas, PLLC

[57] ABSTRACT

A method of navigating including decoding a position-information code represented by a string of codes including the latitude and the longitude of a position entered via an input means into original information on the position including the latitude and the longitude of the position. Information created from the recovered original information resulting from the decoding of the position-information code and map data read out from a map-information storage unit are presented to the user by using a display means and a sound outputting means.

13 Claims, 10 Drawing Sheets

| | GUIDANCE CONDITION | SOUND MESSAGE |
|---|---|---|
| a | $L2 < L1$ | GO AHEAD MORE THAN ONE Km ALONG THIS STREET |
| b | $L3 < L1 \leq L2$ | TURN TO THE RIGHT AT A POINT OF INTERSECTION AT A DISTANCE OF ABOUT ONE Km FROM THE PRESENT POSITION |
| c | $L1 \leq L3$ | TURN TO THE RIGHT SOON AT THE APPROACHING POINT OF INTERSECTION |

ENTER THE CODE OF DESTINATION 0 0 4 1 4 9 0 0 2 9 5 6

| 7 | 8 | 9 |
|---|---|---|
| 4 | 5 | 6 |
| 1 | 2 | 3 |
| 0 | CLR | ENT |

METHOD OF NAVIGATING USING POSITION-INFORMATION-CODES WHICH INCLUDE INFORMATION REGARDING THE LATITUDE AND LONGITUDE OF A DESIRED LOCATION

BACKGROUND OF THE INVENTION

1. Field of the Invention

The present invention relates to a navigation system mounted on a moving body for guiding the moving body through a proper route, a position-information-code creating apparatus for the navigation system, an information presenting system employing a navigation apparatus and its printing media.

2. Description of the Prior Art

FIG. 14 is a block diagram illustrating the concept of a conventional navigation system like the one disclosed in JP-A No. 5-53508. In the figure, reference numeral 1 denotes a control means for carrying out overall control of the navigation system, and reference numeral 2 is a map-information storage means for storing map data. Reference numeral 3 is a present-position detecting means for identifying the present position of a moving body, and reference numeral 4 denotes an input means for forwarding a signal input from a user to the control means 1. Reference numeral 5 is a display means for displaying map information and other data, and reference numeral 6 denotes a number card on which a code number of a destination or a facility at a pass-through position is set. Reference number 7 is a card reading means for reading out a code number of a facility set on the number card 6 and supplying the code number read out from the number card 6 to the control means 1, whereas reference numeral 8 denotes a booklet containing a list of facilities stored in the map-information storage means 2 along with code numbers assigned to the facilities.

Next, the operation of the navigation system is explained as follows.

First of all, a user searches the booklet 8 for a destination and a facility to be set as a pass-through position, and sets their code numbers on the number card 6. Then, the number card 6 is inserted into the card reading means 7 for reading out the code numbers of the facilities set thereon. The control means 1 makes an access to the map-information storage means 2, reading out necessary information indicated by the code numbers supplied by the card reading means 7 from the map-information storage means 2. The control means 1 then displays a symbol mark of the facility on a map already displayed on the display means 5 along with pictures representing information such as the name of the facility.

As described above, in the conventional navigation system, in order to set a facility as a destination, a pass-though position or another cataloged position, the user enters the code number assigned to the facility and stored in the map-information storage means 2 in advance. The control means 1 then selects the information on the facility indicated by the code number entered by the user, and displays the information on the display means 5. As an alternative, the user can directly specify a facility on a map already displayed on the display means 5 or let the map-information storage means 2 be searched for a facility based on the name and the address specified by the user.

It should be noted that, on a leaflet or other media distributed by a store and the like, only a simple map is generally drawn. Thus, if information on, among other things, such a store is not stored in the map-information storage means 2 employed in the navigation system, the simple map on the leaflet cannot be verified on the displayed screen, and a route guidance can not therefore be given.

Since the conventional navigation system has a configuration described above, there is raised a problem that the display of a map screen is required in setting a position as a destination or a pass-through point. In addition, there is also encountered a problem that troublesome operations such as selection of a facility type, specification of the name of a place, moving a cursor accompanied by verification of a position on a map screen, and touching by a finger need to be carried out, which makes the operations of the navigation system complicated.

Further, the conventional navigation system also has a problem that, even if a position can be set by specifying the code number of the position, data such as the name and the address of each facility needs to be stored in the navigation system by using some methods so that it is impossible to set a facility or a position, the address of which is not cataloged in the map-information storage means 2 in advance. In addition, not only does the conventional navigation system require expensive storage media serving as the map-information storage means 2 such as a CD-ROM (compact disk read-only memory) and the number card 6 such as a RAM (random-access memory) card for storing information on positions and information on facilities, but the storage formats are also complicated, giving rise to a problem that it is difficult to utilize the information on positions outside the navigation system and to exchange the information among a variety of navigation systems.

SUMMARY OF THE INVENTION

Addressing the problems described above, it is thus a primary object of the present invention to provide a navigation system which allows a position to be set by specifying an information code of the position using the latitude and the longitude thereof and is therefore capable of setting a position independently of facilities or addresses already stored therein.

In addition, it is a secondary object of the present invention subsidiary to the primary object to provide a navigation system which is capable of expressing any arbitrary position in terms of numbers representing the latitude and the longitude of the position independently of a map display and, by associating such numbers with their respective positions in such a structure that clarifies a one-to-one relation between the numbers and the positions, is further capable of setting a position independently of a map used in a display.

It is another secondary object of the present invention subsidiary to the primary object to provide a navigation system which associates a position with a string of codes in an attempt to reduce the number of mistakes made in setting a position and thus makes the operation simple.

It is still another secondary object of the present invention subsidiary to the primary object to provide a navigation system employing a position setting means independent of map information stored in the map-information storage means, wherein the position setting means allows information on positions generated in one navigation system or a system having a position-information coding means to be transferred to another navigation system or another system without using special equipment for the use of the system.

It is a still further secondary object of the present invention subsidiary to the primary object to provide a position-information-code creating apparatus for a navigation system for coding information on a position into a position-information code.

It is a still further secondary object of the present invention subsidiary to the primary object to provide an information presenting apparatus employing a navigation apparatus for presenting the user with information created by using information on a position obtained by decoding a position-information code printed on printing media, and further to provide the printing media.

In order to achieve the objects described above, according to a first aspect of the present invention, there is provided a navigation system wherein: a string of codes representing a position-information code including a latitude and a longitude of a position supplied thereto is decoded into original information on the position including the latitude and the longitude of the position by a position-information decoding means; and a user is presented with information created from the original information on a position and information created from map data through a presenting means.

As a result, the navigation system according to the first aspect of the present invention exhibits an effect that a position can be set by specifying a code not stored as map data in the navigation system for position setting purposes, allowing the user to set a position easily as well as accurately in an operation to set the position. In addition, there is also exhibited another effect that a position-information code created in one navigation system can be taken to and used in another navigation system or a system of another kind without making use of special equipment.

According to a second aspect of the present invention, there is provided a navigation system comprising a quantization processing means for quantizing a route into a simplified figure revealing characteristics of the route.

As a result, the navigation system according to the second aspect of the present invention exhibits an effect that, by displaying a route in a simplified figure as an arrow only or a deformation diagram without showing a map, it is possible to provide guidance entailing a light load to recognize the substances of the guidance through a simple display picture, allowing the user to set a position easily as well as accurately.

According to a third aspect of the present invention, there is provided a navigation system wherein the position-information code includes a code for detecting an error.

As a result, the navigation system according to the third aspect of the present invention exhibits an effect that it is possible to detect an error during reception or in an operation carried out by the user to set a position and further correct the detected error.

According to a fourth aspect of the present invention, there is provided a navigation system wherein the position-information code includes condition data of a route search.

As a result, the navigation system according to the fourth aspect of the present invention exhibits an effect that, in an operation to set a route, the user can set a proper route without the need to specify a search condition as to whether to give or not to give a high priority to a toll road.

According to a fifth aspect of the present invention, there is provided a navigation system wherein the position-information code includes information on a facility.

As a result, the navigation system according to the fifth aspect of the present invention exhibits an effect that the information on a facility can be used to verify a set position or to catalog facilities classified by type.

According to a sixth aspect of the present invention, there is provided a navigation system wherein: a string of codes representing the position-information code including a latitude and a longitude of the location of a parking-place belonging to a facility to be set or a parking-place in close proximity to the facility is decoded into original information on the position including the latitude and the longitude; and the user is presented with information created from the original information on a position and information created from map data through a presenting means.

As a result, the navigation system according to the sixth aspect of the present invention exhibits an effect that the user can drive the vehicle toward the parking-place at the destination smoothly, eliminating the labor and the time required for finding the parking-place after arriving at the destination.

According to a seventh aspect of the present invention, there is provided a navigation system wherein the position-information code includes latitudes and longitudes of a plurality of positions.

As a result, the navigation system according to the seventh aspect of the present invention exhibits an effect that the information on a route passing through a plurality of positions can be used to set a predetermined course, eliminating the labor and the time required by the user for specifying the places separately one by one.

According to an eighth aspect of the present invention, there is provided a navigation system wherein a position-information decoding program for decoding a position-information code into information on a position including a latitude and a longitude of the position is stored in advance in an external storage device.

As a result, the navigation system according to the eighth aspect of the present invention exhibits an effect that replacement of a bad portion of the position-information decoding program by a good one or replacement of an old portion by a new version can be carried out with ease.

According to a ninth aspect of the present invention, there is provided a position-information-code creating apparatus for a navigation system comprising a position-information coding means for coding information on a position including a latitude and a longitude of the position into a string of codes representing a position-information code.

As a result, the position-information-code creating apparatus according to the ninth aspect of the present invention exhibits an effect that the position-information code of any arbitrary position set in the navigation system can be converted into another position-information code by using another position setting system, allowing a plurality of users to share a position-information code as a common position information.

According to a tenth aspect of the present invention, there is provided a position-information-code creating apparatus for a navigation system wherein a position-information coding program for coding information on a position including a latitude and a longitude of the position into a position-information code is stored in advance in an external storage device.

As a result, the position-information-code creating apparatus according to the tenth aspect of the present invention exhibits an effect that replacement of a bad portion of the position-information coding program by a good one or replacement of an old portion by a new version can be carried out with ease.

According to an eleventh aspect of the present invention, there is provided an information presenting system comprising: a reading means for reading out a position-information code from printing media on which the position-information code was printed; a position-information decoding means for decoding the position-information code read out by the reading means into information on a position; and a navigation apparatus for presenting the user with information created from the information on a position produced by the position-information decoding means.

As a result, in the information presenting system according to the eleventh aspect of the present invention, a position-information code printed on printing media such as a leaflet, a magazine and a name card can be entered to the navigation apparatus as information on the location of a desired facility with ease, giving rise to another effect of exciting the user's will to use the facility, one of effects of advertisement that can be expected.

According to a twelfth aspect of the present invention, there is provided an information presenting system comprising a display means for displaying information created from the information on a position produced by a position-information decoding means.

As a result, the information presenting system according to the twelfth aspect of the present invention exhibits an effect that, since a minor modification of the specifications of the conventional navigation apparatus is sufficient to make the information presenting system according to the twelfth aspect of the present invention work, it is possible to reduce an increase in price of the navigation system.

According to a thirteenth aspect of the present invention, there is provided printing media for printing a string of characters or a bar code representing a position-information code.

As a result, the printing media according to the thirteenth aspect of the present invention has an effect that, since the position-information code is merely printed on paper or the like, the printing media can be produced in volume, allowing information on locations required by the user to be presented to the user by using cheap media.

BRIEF DESCRIPTION OF THE DRAWINGS

Other objects as well as many of the attendant advantages of the present invention will be readily appreciated as the same becomes better understood by reference to the following detailed description when studied in connection with the accompanying drawings wherein.

DETAILED DESCRIPTION OF THE PREFERRED EMBODIMENTS

The present invention will become more apparent from a study of the following detailed description of some preferred embodiments with reference to the accompanying diagrams.

First Embodiment

Figure 1:
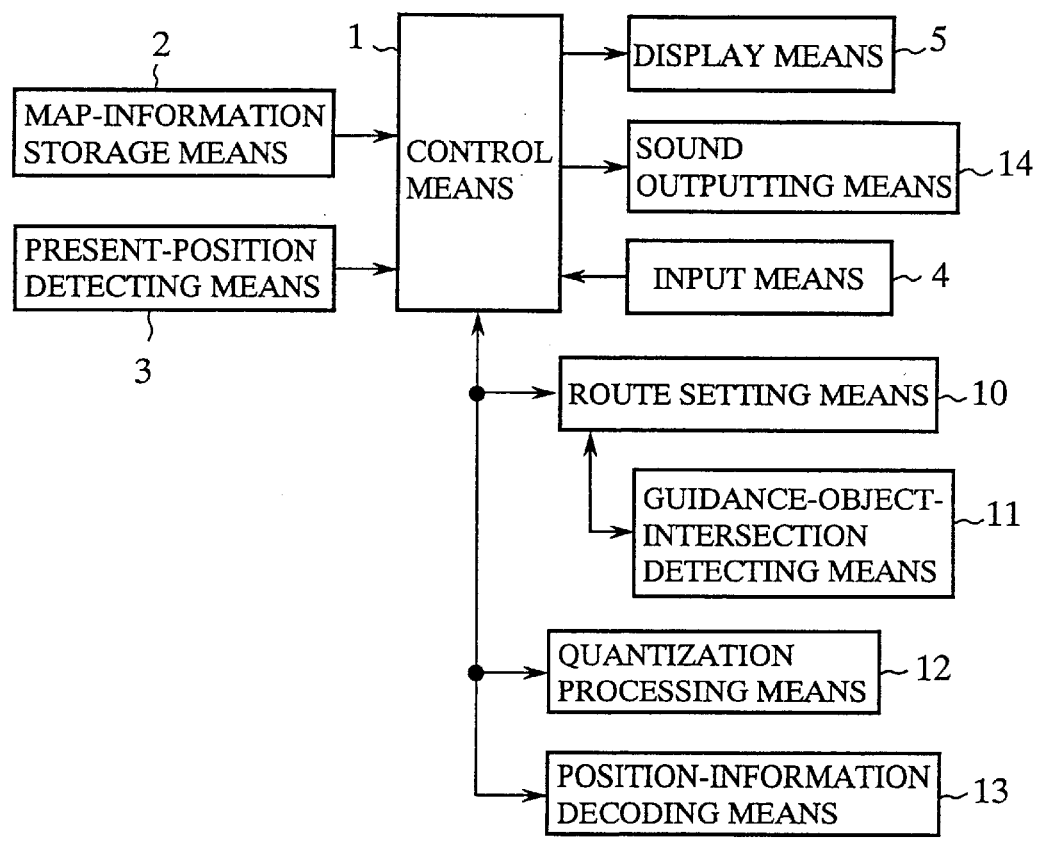
FIG. 1 is a block diagram showing a functional configuration of a navigation system implemented by a first embodiment of the present invention.
Figure 14:
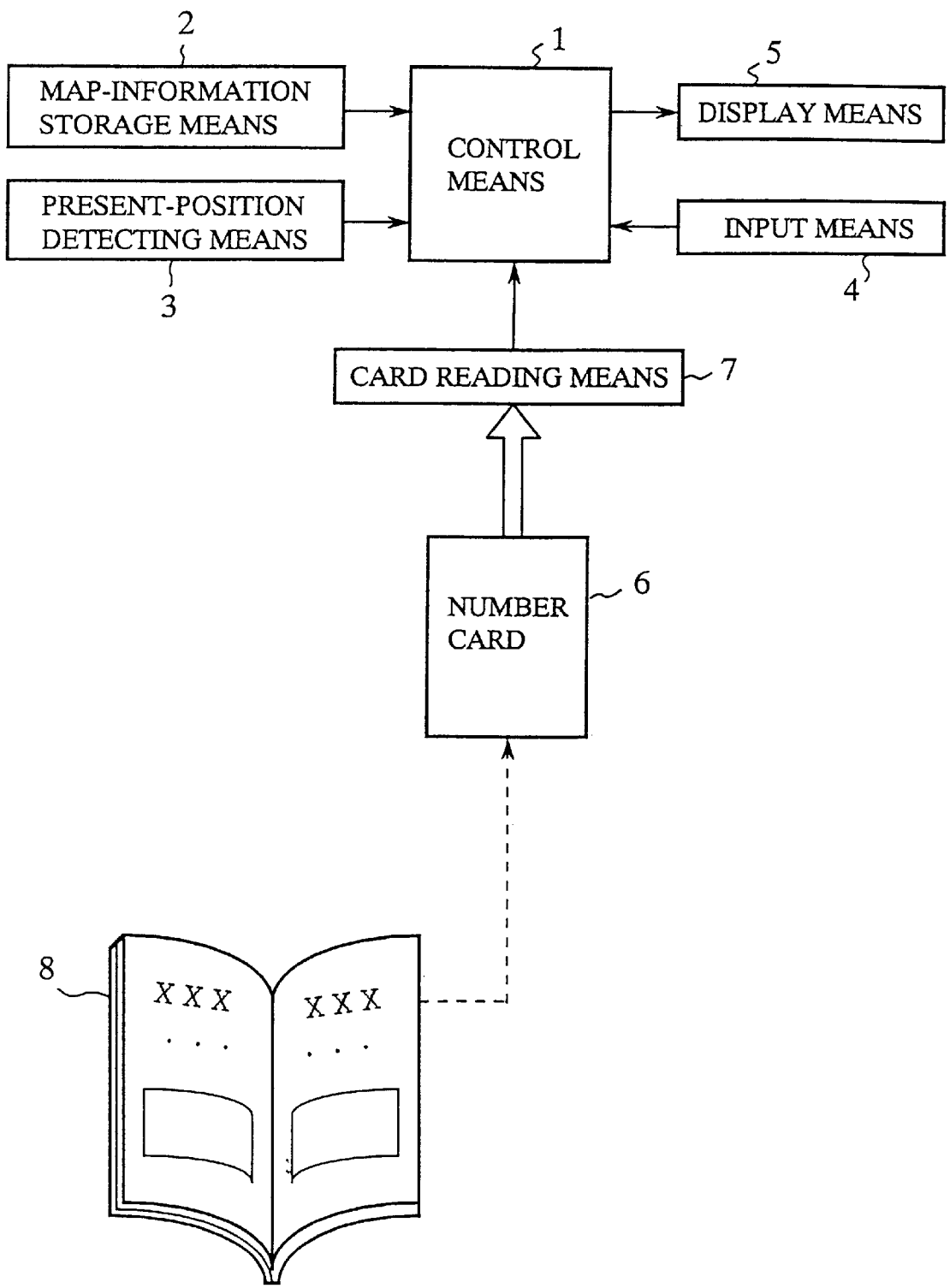
FIG. 14 is a block diagram showing the conventional navigation system.

FIG. 1 is a block diagram showing a functional configuration of a navigation system implemented by a first embodiment of the present invention. In the figure, reference numeral 1 denotes a control means for carrying out a variety of processing in the navigation system and overall control of the navigation system and reference numeral 2 is a map-information storage means connected to the control means 1. The map-information storage means 2 is used for storing digital map data such as road data and data of points of intersection. Reference numeral 3 is a present-position detecting means connected to the control means 1. The present-position detecting means 3 is used for identifying the present position of a moving body on which the navigation system is mounted. Reference numeral 4 denotes an input means for forwarding a signal input from the user to the control means 1. Reference numeral 5 is a display means controlled by the control means 1 for displaying routes quantized by a quantization processing means to be described later for a point of intersection, an object of guidance detected by a guidance-object-intersection detecting means also to be described later. It should be noted that components of FIG. 1 denoted by the same reference numerals as the components shown in FIG. 14 are identical with those of the latter figure.

Reference numeral 10 is a route setting means for setting a route between two positions of map data stored in the map-information storage means 2 and reference numeral 11 denotes a guidance-object-intersection detecting means for detecting a major point of intersection and a left/right turn on a route set by the route setting means 10 as guidance-object points of intersection to be included in the path of guidance. Reference numeral 12 is a quantization processing means for quantizing the present position and the path of guidance of the moving body into a simplified figure revealing characteristics of the path on the basis of relations of distances between the present position and closest guidance-object points of intersection. An example of the simplified figure is a display of arrows only or a display of a deformation diagram. Reference numeral 13 is a position-information decoding means for decoding a position-information code represented by a string of codes entered via the input means 4 into original information on a position including the latitude and the longitude of the position. Reference numeral 14 is a sound outputting means serving as a presenting means which is used for notifying the user of a guidance result by outputting an audio message. The guidance accompanies a route to be taken by the moving body resulting from quantization carried out by the quantization processing means 12 when the route is displayed on the display means 5.

Figure 2:
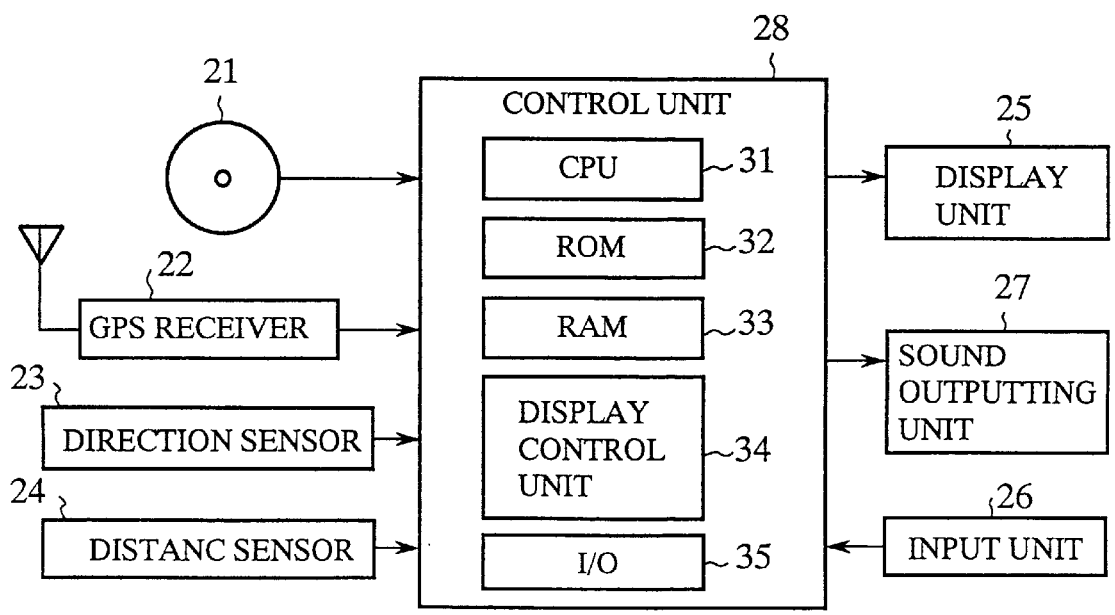
FIG. 2 is an explanatory diagram showing a hardware configuration of the navigation system implemented by the first embodiment.

FIG. 2 is an explanatory block diagram showing a hardware configuration of the navigation system implemented by the first embodiment. In this figure, reference numeral 21 denotes a CD-ROM and its reading apparatus. The CD-ROM is used for storing digital map data. The CD-ROM and its reading apparatus correspond to the map-information storage means 2 shown in FIG. 1. Reference numeral 22 denotes a GPS (Global Positioning System) receiver for receiving an electric wave transmitted by an artificial satellite in order to determine the present position of the moving body on which the navigation system is mounted and reference numeral 23 is a direction sensor for detecting a direction toward which the moving body is oriented. Reference numeral 24 is a distance sensor for detecting a traveling distance of the moving body. The GPS receiver 22, the direction sensor 23 and the distance sensor 24 constitute the present-position detecting means 3 shown in FIG. 1.

Reference numeral 25 is a display unit for displaying data such as quantized routes on a screen. The display unit 25 is typically implemented by a liquid-crystal display. Reference numeral 26 is an input unit utilized by the user for entering signals for operating the navigation system. The input unit 26 is implemented typically by a touch panel provided on the screen of the display unit 25. The display unit 25 and the input unit 26 correspond to the display means 5 and the input means 4 shown in FIG. 1 respectively. Reference numeral 27 is a sound outputting unit for outputting sound representing a guidance message accompanying a display appearing on the display unit 25. The sound outputting unit 27 corresponds to the sound outputting means 14 shown in FIG. 1. Reference numeral 28 is a control unit for carrying overall control and a variety of processing of the navigation system. The control unit 28 corresponds to the control means 1 shown in FIG. 1.

In the control unit 28, reference numeral 31 is a CPU (Central Processing Unit) for carrying out overall control of the control unit 28 and reference numeral 32 denotes a ROM (Read-Only Memory) unit for storing data such as a program executed by the CPU 31 in performing its operations and necessary constants. Reference numeral 33 is a RAM (Random-Access Memory) unit for loading data such as a program and map information in the course of processing carried out by the CPU 31 and for storing results of the processing. Reference numeral 34 is a display control unit for controlling operations to output a display to the display unit 25 and reference numeral 35 is an I/O (input/output) unit serving as an interface between the control unit 28 and the various external units 21 to 27. It should be noted that elements such as the route setting means 10, the guidance-object-intersection detecting means 11, the quantization processing means 12 and the position-information decoding means 13 are actually functions which are implemented by processing operations carried out by the control unit 28.

Figure 3:
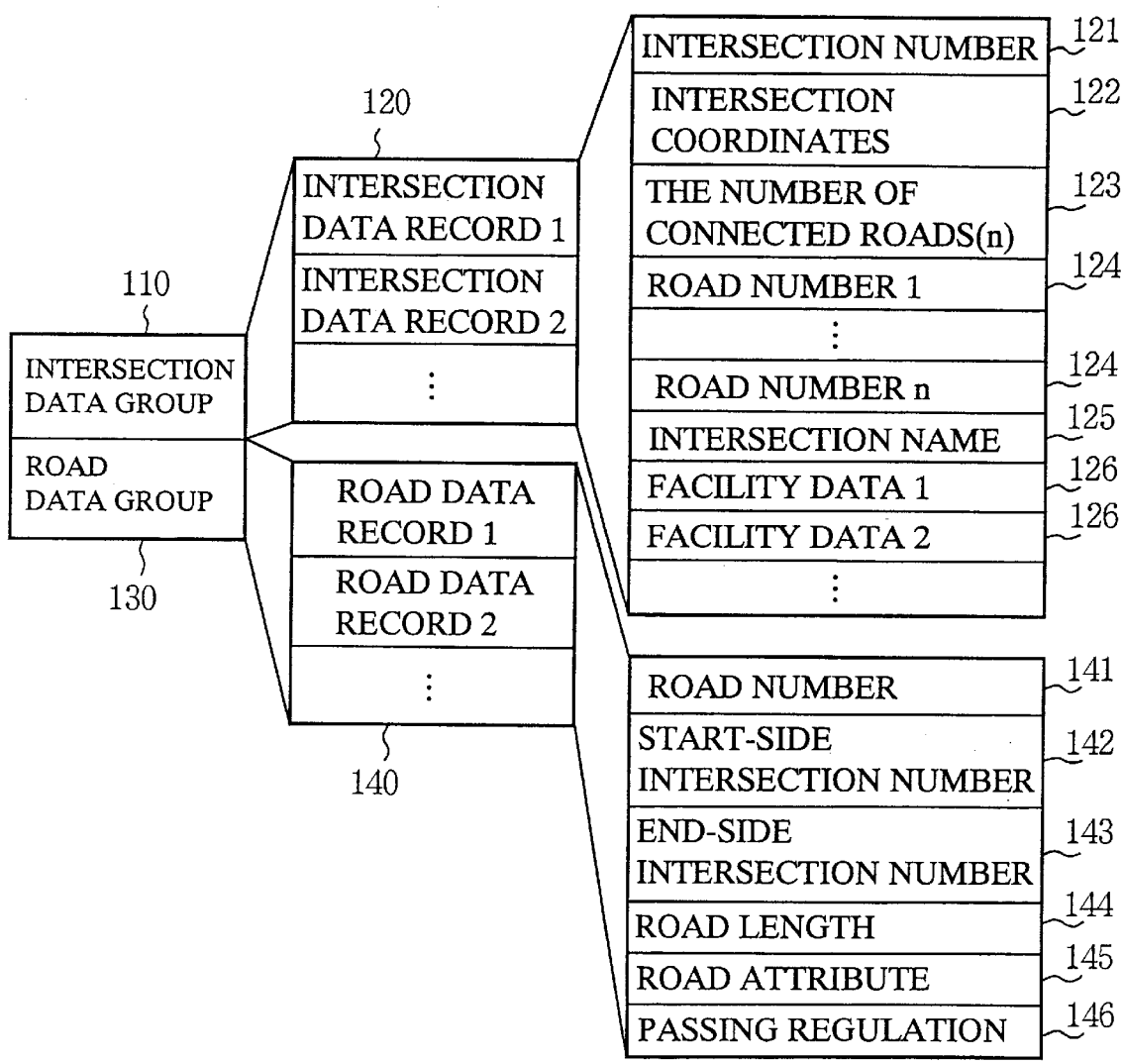
FIG. 3 is an explanatory diagram showing an example of a structure of map data used in the navigation system implemented by the first embodiment.

FIG. 3 is an explanatory diagram showing an example of a structure of map data stored in the map-information storage means of the navigation system implemented by the first embodiment. In the figure, reference numeral 110 denotes an intersection data group, one of structure elements of the map data. The intersection data group 110 is a collection of intersection data records 120. Each of the intersection data records 120 is a collection of pieces of information on a particular point of intersection. Thus, the intersection data group 110 is a group of data comprising a plurality of intersection data records 120 each comprising a plurality of pieces of information on a particular point of intersection. Reference numeral 130 is a road data group, the other structure element of the map data. The road data group 130 is a collection of road data records 140. Each of the road data records 140 is a collection of pieces of information on a particular road. Thus, the intersection data group 130 is a group of data comprising a plurality of road data records 140 each comprising a plurality of pieces of information on a particular road.

The pieces of information on a particular point of intersection composing an intersection data record 120 are described as follows. Reference numeral 121 is an ID (identification) number assigned uniquely to the particular point of intersection and reference numeral 122 denotes the coordinates of the position on the map at which the particular point of intersection is located. The coordinates are typically expressed in terms of the latitude and the longitude of the position. Reference numeral 123 is the number of connected roads, that is, the number of roads connected to the particular point of intersection. Reference numeral 124 is the road number of a road connected to the particular point of intersection and reference numeral 125 is an intersection name, the name of the particular point of intersection. Reference numeral 126 is facility data, a collection of pieces of information on facilities existing at places in close proximity to the particular point of intersection. Thus, each of the intersection data records 120 comprises the intersection number 121, the intersection coordinates 122, the intersection connected-road count 123, as many connected-road numbers 124 as the connected roads, the intersection name 125 and the intersection facility data 126.

Similarly, each of the road data records 140 comprises pieces of information on a particular road as follows. Reference numeral 141 is an ID (identification) number assigned uniquely to the particular road. Reference numeral 142 is a start-side intersection number representing a point of intersection connected to the start of the particular road and reference numeral 143 is an end-side intersection number representing a point of intersection connected to the end of the particular road. Reference numeral 144 is the length of the particular road and reference numeral 145 is a road attribute for indicating the type of the particular road, that is, for indicating whether the particular road is a highway, a national road, a prefectural road or a small street. Reference numeral 146 is information on a road-passing regulation. In brief, each of the road data records 140 comprises the road number 141, the start-side intersection number 142, the end-side intersection number 143, the road length 144, the road attribute 145 and the road-passing regulation 146.

Figures 4, 7, 8:
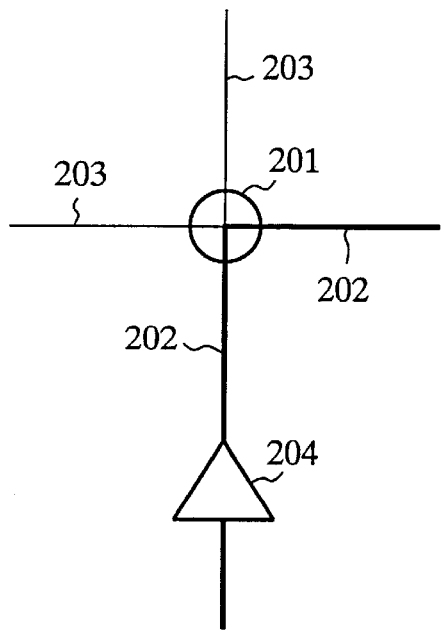
FIG. 4 is an explanatory diagram showing an example of a route set in the navigation system implemented by the first embodiment.
FIG. 7 is an explanatory diagram showing examples of sound messages announced by the navigation system implemented by the first embodiment.
FIG. 8 is an explanatory diagram showing an example of an input screen for entering a position-information code displayed by the navigation system implemented by the first embodiment.

FIG. 4 is an explanatory diagram showing an example of a route set by the route setting means 10 of the navigation system implemented by the first embodiment. In this figure, reference numeral 201 is a guidance-object point of intersection determined by the guidance-object-intersection detecting means 11 and reference numeral 202 denotes roads set as a route. The roads 202 are referred to hereafter as route roads. Reference numeral 203 denotes roads other than the route roads 202 and reference numeral 204 is the present position of the moving body.

Figure 5:
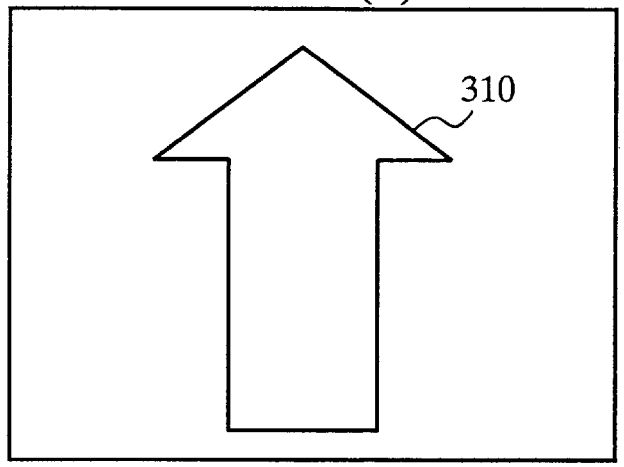
FIGS. 5A, 5B and 5C are explanatory diagrams each showing an example of an information map of a point of intersection displayed in the navigation system implemented by the first embodiment.
Figure 5:
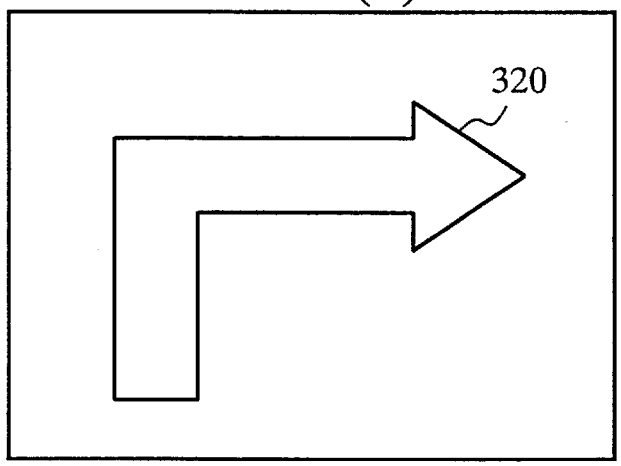
Figure 5:
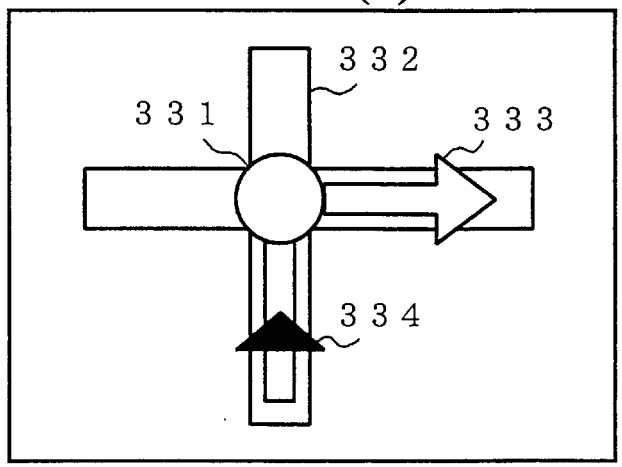

FIGS. 5A, 5B and 5C are explanatory diagrams each showing an example of an information map of a point of intersection, a result of processing carried out by the quantization processing means 12, displayed on the display means 5. More specifically, FIG. 5A is a diagram showing an example of a display of a case in which a distance L1 from the present position of the moving body to a guidance-object point of intersection is longer than a first predetermined value L2 of typically 1,000 m. Reference numeral 310 shown in FIG. 5A is a figure representing a road route of a journey. On the other hand, FIG. 5B is a diagram showing an example of a display of a case in which the distance L1 from the present position of the moving body to a guidance-object point of intersection is shorter than the first predetermined value L2 but longer than a second predetermined value L3 of typically 300 m. Reference numeral 320 shown in FIG. 5B is a figure roughly representing a road route with a change in direction, that is, a road turning to the right. Finally, FIG. 5C is a diagram showing an example of a display of a case in which the distance L1 from the present position of the moving body to a guidance-object point of intersection is shorter than the second predetermined value L3. In this figure, reference numeral 331 is a guidance-object point of intersection at which the route changes its direction and reference numeral 332 denotes the shape of roads in close proximity to the guidance-object point of intersection 331. Reference numeral 333 is a route of guidance and reference numeral 334 denotes the present position of the moving body.

Figure 6:
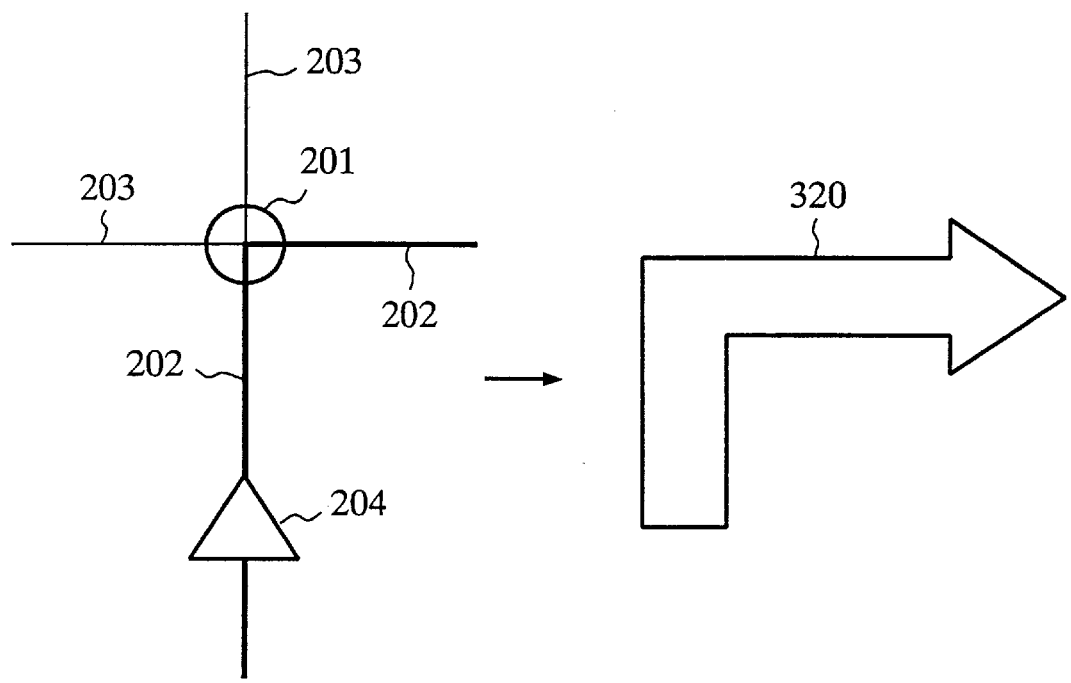
FIGS. 6A and 6B are explanatory diagrams each showing an example of a method of quantizing a point of intersection, an object of guidance in the navigation system implemented by the first embodiment.
Figure 6:
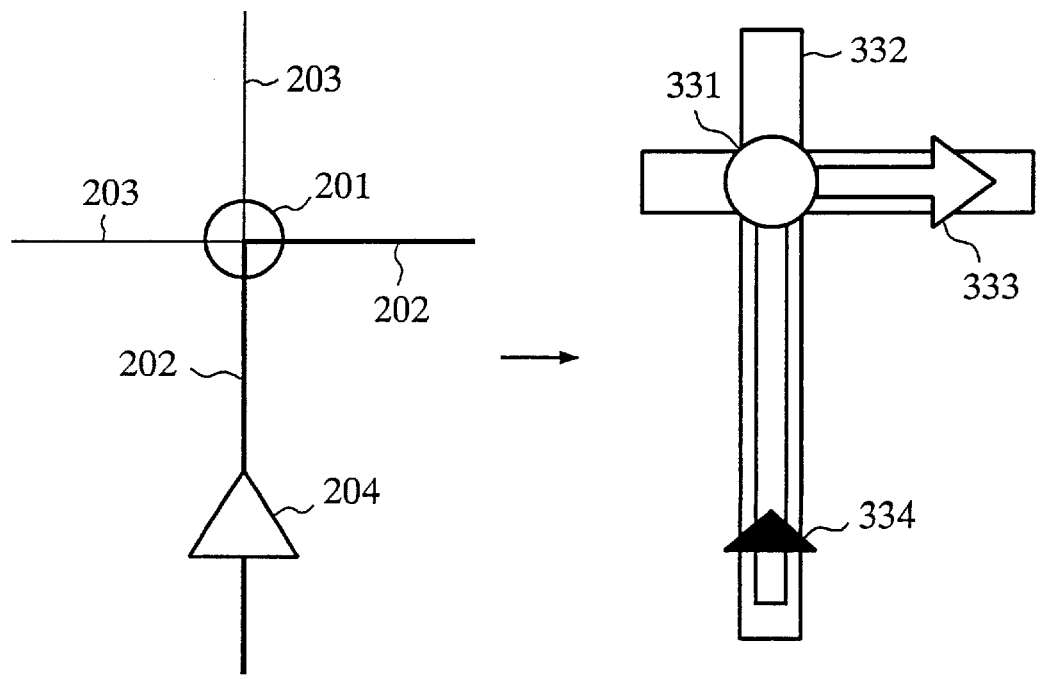

FIGS. 6A and 6B are explanatory diagrams each showing an example of processing carried out by the quantization processing means 12. More specifically, FIG. 6A is a diagram showing an example of processing to display the figure shown in FIG. 5B and FIG. 6B is a diagram showing an example of processing to display the figure shown in FIG. 5C. Elements shown in FIGS. 6A and 6B identical with those shown in FIGS. 4, 5B and 5C are denoted by the same reference numerals as those used in the latter figures and their explanation is omitted. In the example shown in FIG. 6A, only the route road 202 connected to the guidance-object point of intersection 201 is extracted into a display FIG. 320 resembling a bent arrow. In the example shown in FIG. 6B, on the other hand, the guidance-object point of intersection 331, a road 332 connected to the guidance-object point of intersection 331, the guidance route 333 and the present position 334 of the moving body are extracted for a display from the guidance-object point of intersection 201, the route roads 202 connected to the guidance-object point of intersection 201, roads 203 connected to the guidance-object point of intersection 201 other than the route roads 202 and the present position 204 of the moving body. The guidance-object point of intersection 331 and the road 332 are displayed with shapes resembling a circle and a quadrilateral respectively. It should be noted that a shape resembling a triangle may also be displayed if necessary. Superposed on the guidance-object point of intersection 331 and the road 332, the guidance road 333 is displayed with a shape resembling an arrow. The present position 334 is further superposed on the guidance road 333. In this way, proper information can be displayed in each case in accordance with a positional relation with the guidance-object point of intersection.

FIG. 7 is an explanatory diagram showing examples of sound guidance messages announced by the sound outputting means 14 for displays appearing on the display unit 5. In the figure, reference numeral 410 denotes a guidance message output by the sound outputting means 14 and reference numeral 420 is a condition under which the guidance message is output. With the moving body moving forward along a route toward a guidance-object point of intersection, if the distance L1 from the present position of the moving body to a guidance-object point of intersection is longer than a first predetermined value L2, a sound message saying: "A road of at least one km lies ahead" shown on the 'a' row of FIG. 7 is output. As the distance L1 becomes equal to or shorter than the first predetermined value L2, a sound message saying: "Turn to the right at a point of intersection at a distance of about one km from the present position" shown on the 'b' row of FIG. 7 is output. When the distance L1 further becomes equal to or shorter than the second predetermined value L3, a sound message saying: "Turn to the right soon at the approaching point of intersection" shown on the 'c' row of FIG. 7 is output.

FIG. 8 is an explanatory diagram showing an example of an input screen for entering a string of codes such as a position-information code to be interpreted by the position-information decoding means 13. In the figure, reference numeral 511 denotes a string of codes or a position-information code entered by the user and reference numeral 512 denotes the ten keys each implemented by a touch sensor for entering a string of codes. It should be noted that, while the ten keys 512 implemented by touch sensors are used for entering a string of codes in this embodiment, the description is not to be construed in a limiting sense. For example, another input means such as a remote controller or a bar-code reader can also be used as well. Reference numeral 513 is a string of characters explaining what the string of codes or the position-information code to be entered by the user is. In the displayed example, the string of characters indicates that the string of codes or the position-information code to be entered by the user is the position-information code of a destination. In the case of a position-information code of another location such as a pass-through location, the present position or a location at which another vehicle exists, the string of characters will indicate so.

The principle of operation of the navigation system implemented by the first embodiment is explained as follows.

Figure 9:
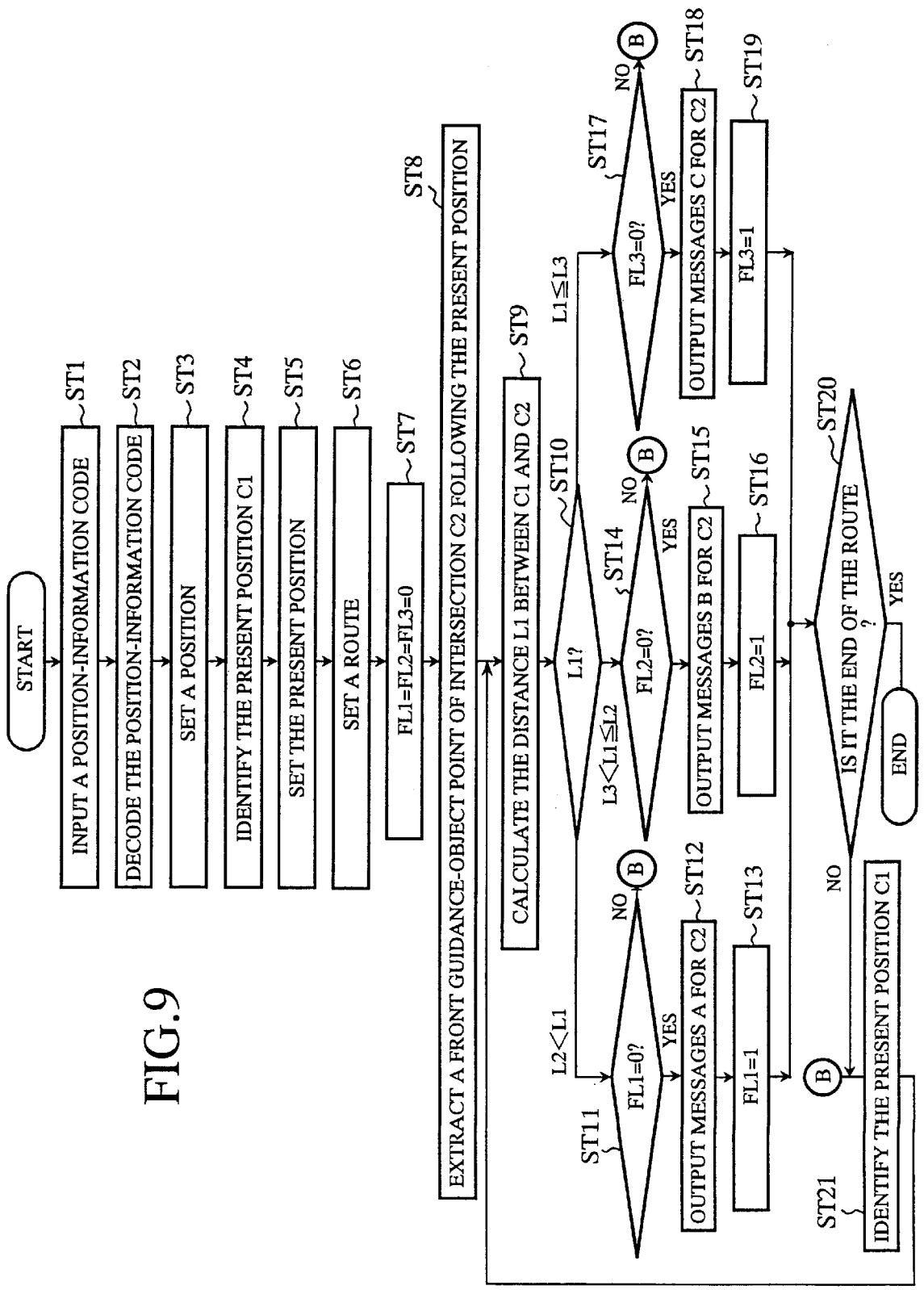
FIG. 9 is a flowchart showing operations carried out by the navigation system implemented by the first embodiment.

FIG. 9 is a flowchart showing a flow of processing carried out by the navigation system implemented by the first embodiment. As shown in the figure, the flowchart begins with a step ST1 at which the user enters a position-information code via the input means 4. The position-information code is a string of codes resulting from conversion of information including a latitude and a longitude into typically a string of numerical digits. By reversed conversion, the position-information code can be converted back into the original information. The position-information code may be described in a magazine or announced by radio broadcasting so that the user who knows the position-information code can enter it to the navigation system through a screen shown in FIG. 8.

The flow of processing then goes on to a step ST2 at which the position-information code entered via the input means 4 is decoded by the position-information decoding means 13 to obtain the original latitude and the longitude of the position.

The original latitude and longitude of a position are recovered by decoding the position-information code using an algorithm shown below. Let notation Ncode denote a string of codes representing a position-information code, the latitude of the position be xd degrees, xm minutes and xs seconds North and the longitude of the position be yd degrees, ym minutes and ys seconds East. In this case, relations between Ncode, xd [expressed in terms of degrees], xm [expressed in terms of minutes], xs [expressed in terms of seconds], yd [expressed in terms of degrees], ym [expressed in terms of minutes], ys [expressed in terms of seconds] are given as follows:

$$xd = \text{int}(Ncode/xd1) + xd2 \tag{1}$$
$$xm = \text{int}[\{Ncode - (xd - xm1) \times xm2\}/xm3]$$
$$xs = \text{int}[\{Ncode - (xd - xm1) \times xm2 - xm \times xm3\}/xs1]$$
$$yd = \text{int}[\{Ncode - (xd - xm1) \times xm2 - xm \times xm3 - xs \times xs1\}/yd1] + yd2$$
$$ym = \text{int}[\{Ncode - (xd - xm1) \times xm2 - xm \times xm3 - xs \times xs1 - yd \times yd1\}/ym1]$$
$$ys = \text{int}[\{Ncode - (xd - xm1) \times xm2 - xm \times xm3 - xs \times xs1 - yd \times yd1 - ym \times ym1\}]$$

When recovering the original position information from a position-information code Ncode=044149352956 by using Eq. 1 given above, the following values are substituted for xd1, xd2, xm1, xm2, xm3, xs1, yd1, yd2 and ym1 of Eq. 1: xd1=1010, xd2=30, xm1=34, xm2=1010, xm3=108, xs1=106, yd1=104, yd2=100 and ym1=108 to result in Eq. 2 as follows:

$$xd = \text{int}(Ncode/1010) + 30 \tag{2}$$
$$xm = \text{int}[\{Ncode - (xd - 34) \times 1010\}/108]$$
$$xs = \text{int}[\{Ncode - (xd - 34) \times 1010 - xm \times 108\}/106]$$
$$yd = \text{int}[\{Ncode - (xd - 34) \times 1010 - xm \times 106 - xs \times 106\}/104] - 100$$
$$ym = \text{int}[\{Ncode - (xd - 34) \times 1010 - xm \times 106 - xs \times 106 - yd \times 104\}/102]$$
$$ys = \text{int}[\{Ncode - (xd - 34) \times 1010 - xm \times 108 - xs \times 106 - yd \times 104 - ys \times 102\}]$$

By using Eq. 2, the latitude and longitude of the point are recovered from the position-information code Ncode= 044149352956 to be a north latitude of 34 degrees, 41 minutes and 49 seconds and an east longitude of 135 degrees, 29 minutes and 56 seconds respectively.

The flow of processing then proceeds to a step ST3 at which the position represented by the position-information code is set as a pass-through point or a destination. Subsequently, the flow of processing continues to a step ST4 at which the present position C1 of the moving body is identified by using the present-position detecting means 3. Then, the flow of processing goes on to a step ST5 at which the identified present position is also set as an input point. Subsequently, the flow of processing proceeds to a step ST6 at which a route between the two set points on the map, the present position and the pass-through point or the destination, is set by the route setting means 10 by using a general search algorithm on a network such as Dijkstra's method.

The flow of processing then continues to a step ST7 at which flags FL1, FL2 and FL3 are each initialized to zero. Subsequently, the flow of processing goes on to a step ST8 at which the guidance-object-intersection selecting means 11 detects a point of intersection on the route set by the route setting means 10, extracting the point of intersection as a guidance-object point of intersection C2. Located after the present position identified by the present-position detecting means 3, one of the two set points set by the route setting means 10, the point of intersection C2 is typically an intersection of three or more roads. The flow of processing then goes on to a step ST9 at which the distance L1, that is, the length of a road between the present position C1 and the guidance-object point of intersection C2, is found. Subsequently, the flow of processing proceeds to a step ST10 at which the distance L1 is compared with first and second predetermined values L2 and L3 to determine next processing to be carried out.

To put it in detail, if the distance L1 is found longer at the step ST10 than the first predetermined value L2 which is typically set at 1,000 m, the flow of processing continues to a step ST11 to find out whether or not the first flag FL1 has been reset to zero. If the first flag FL1 is found reset at zero, that is, if a guidance message A (to be described later) for the front guidance-object point of intersection C2 has not been output yet, the flow of processing goes on to a step ST12 at which the guidance message A is output. Typically, the guidance message A comprises an intersection guidance map for the front guidance-object point of intersection C2 displayed on the display means 5 like the one shown in FIG. 5A, and a sound message for the front guidance-object point of intersection C2 output by the sound outputting means 14 like the one shown on the row 'a' of FIG. 7. As an alternative, the guidance message A comprises only the sound message for the front guidance-object point of intersection C2 output by the sound outputting means 14 like the one shown on the row 'a' of FIG. 7. After outputting the guidance message A, the flow of processing proceeds to a step ST13 at which the first flag FL1 is set to "1" to indicate that the guidance message A for the front guidance-object point of intersection C2 has been output.

It should be noted that, if the distance L1 is found equal to or shorter than the first predetermined value L2 but longer than the second predetermined value L3 which is typically set at 300 m at the step ST10, the flow of processing goes on to a step ST14 to find out whether or not the second flag FL2 has been reset to zero. If the second flag FL2 is found reset at zero, that is, if a guidance message B (to be described later) for the front guidance-object point of intersection C2 has not been output yet, the flow of processing goes on to a step ST15 at which the guidance message B is output. Typically, the guidance message B comprises an intersection guidance map for the front guidance-object point of intersection C2 displayed on the display means 5 like the one shown in FIG. 5B, and a sound message for the front guidance-object point of intersection C2 output by the sound outputting means 14 like the one shown on the row 'b' of FIG. 7 as is the case with the guidance message A. As an alternative, the guidance message B comprises only the sound message for the front guidance-object point of intersection C2 output by the sound outputting means 14 like the one shown on the row 'b' of FIG. 7. After outputting the guidance message B, the flow of processing proceeds to a step ST16 at which the second flag FL2 is set to "1" to indicate that the guidance message B for the front guidance-object point of intersection C2 has been output.

If the distance L1 is found equal to or shorter than the second predetermined value L3 at the step ST10, the flow of processing continues to a step ST17 to find out whether or not the third flag FL3 has been reset to zero. If the third flag FL3 is found reset at zero, that is, if a guidance message C (to be described later) for the front guidance-object point of intersection C2 has not been output yet, the flow of processing goes on to a step ST18 at which the guidance message C is output. Typically, the guidance message C comprises an intersection guidance map for the front guidance-object point of intersection C2 displayed on the display means 5 like the one shown in FIG. 5C, and a sound message for the front guidance-object point of intersection C2 output by the sound outputting means 14 like the one shown on the row 'c' of FIG. 7 as is the cases with the guidance messages A and B described earlier. As an alternative, the guidance message C comprises only the sound message for the front guidance-object point of intersection C2 output by the sound outputting means 14 like the one shown on the row 'c' of FIG. 7. After outputting the guidance message C, the flow of processing proceeds to a step ST19 at which the third flag FL3 is set to "1" to indicate that the guidance message C for the front guidance-object point of intersection C2 has been output.

After setting the first, second or third flag FL1, FL2 or FL3 to "1" at the step ST13, ST16 or ST19 respectively, the flow of processing goes on to a step ST20 to form a judgment as to whether or not processing till the end of the set route has been completed. If the outcome of the judgment indicates that the processing has not been completed yet, the flow of processing goes on to a step ST21 at which the present position C1 of the moving body is identified. Then, the flow of processing returns to the step ST9 to carry out the operations described above repeatedly till the processing up to the end of the set route found completed at the step ST20. If the first, second or third flag FL1, FL2 or FL3 is found set to "1" at the step ST11, ST14 or ST17 respectively, on the other hand, the flow of processing goes on directly to the step ST21 by-passing the steps ST12 and ST13, ST15 and ST16 or ST18 and ST19 respectively.

As described above, when the moving body is advancing along the set route toward the guidance-object point of intersection C2 at a distance Li between the present position C1 and the guidance-object point of intersection C2 longer than the first predetermined value L2 which is typically set at 1,000 m, that is, when the moving body is continuously making a straight advance on, a direction 310 like the one shown in FIG. 5A is displayed on the display means 5 and a sound message for the front guidance-object point of intersection C2 saying: "A road of at least one km lies ahead" like the one shown on the row 'a' of FIG. 7 is output by the sound outputting means 14. Then, at a point of time the distance L1 between the present position C1 and the guidance-object point of intersection C2 becomes equal to or shorter than the first predetermined value L2, the messages are switched to a direction 320 like the one of FIG. 5B displayed on the display means 5, and a sound message for the front guidance-object point of intersection C2 saying: "Turn to the right at a point of intersection at a distance of about one km from the present position" like the one shown on the row 'b' of FIG. 7 output by the sound outputting means 14. Finally, at a point of time the distance L1 between the present position C1 and the guidance-object point of intersection C2 becomes equal to or shorter than the second predetermined value L3 which is typically set at 300 m, the messages are switched to a FIG. 331 of the front guidance-object point of intersection C2, the shape of the road 332 in close proximity to the front guidance-object point of intersection 331, a guiding route 333 and the present position 334 like the ones of FIG. 5C displayed on the display means 5, and a sound message for the front guidance-object point of intersection C2 saying: "Turn to the right soon at the approaching point of intersection" like the one shown on the row 'c' of FIG. 7 output by the sound outputting means 14.

As described above, according to the first embodiment, a location not stored in the map-information storage means 2 can be set by merely entering a string of codes such as a string of numbers representing the position-information code assigned to the location. As a result, the operation to set a location becomes simple, allowing the user to set a position with ease. At the same time, the first embodiment also exhibits an effect that the navigation system allows the user to specify a position without relying on information stored in the map-information storage means 2 by merely setting a position-information code including the latitude and longitude of the position.

In addition, since a position can be set without the need to display a map, the embodiment also exhibits an effect that a route display not relying on a displayed map can be applied to other setting of a position in a navigation system wherein route guidance is carried out by displaying a quantized simple figure of a deformation diagram showing only a displayed arrow.

As described above, in the first embodiment, the position-information code includes the latitude and longitude of the position. It should be noted that the navigation system may be provided with another feature such as addition of an error detection/correction code for detection of an input error made by the user and correction of any detected input error. That is to say, the navigation system may be designed as a system capable of detecting an input error which is made by the user when the user enters a position-information code and further has a facility for storing correction codes for correcting an error detected in the system.

In addition, as described above, in the first embodiment, a position is set by specifying the position-information code which includes the latitude and longitude of the position. It should be noted that the position-information code may also include information specifying a route searching mode which can be used for giving or not giving a high priority to a toll road. In this way, the road searching condition can be optimized without the need for the user to specify this road searching condition.

In addition, as described above, in the first embodiment, the position-information code includes the latitude and longitude of the position. In addition, the position-information code may include a code indicating the type of a facility such as a hotel, a train station and a government office as well as the name of a facility. By using such information, the user can thus verify a set position or make a change to a parameter used in the setting of a route that modifies a condition for setting a route by using a facility.

In addition, as described above, in the first embodiment, a position-information code includes the latitude and longitude of a facility. It should be noted that the latitude and longitude of a parking-place belonging to a facility or a parking-place in close proximity to a facility can also be used. In this case, a separate flag is required. More specifically, the value of the flag is used to indicate whether a latitude and a longitude included in a position-information code are used to directly specify a position, or a parking-place for the position such as a parking-place of a hotel or an amusement park. It is worth noting that other information can be added to indicate that a set position itself is a parking-place.

In addition, as described above, in the first embodiment, a position-information code includes the latitude and longitude of only one position. It should be noted, however, that the position-information code may include latitudes and longitudes of a plurality of positions. In the case of such a position-information code, a plurality of positions can be set simultaneously at one time. Further, if information on a route passing through a plurality of positions along with an order the positions on the route are to be passed through are added, the navigation system can be used to set a predetermined course of a tour through the positions such as sight-seeing places.

In addition, as described above, the first embodiment implements a navigation system not using a map display. It should be noted that, much like a navigation system making use of a map display, it is needless to say that the first embodiment allows a system which utilizes the position-information decoding means 13 for decoding a position-information code including the latitude and the longitude of a position entered by the user to be built.

In addition, as described above, in the first embodiment, a position-information decoding program for decoding a position-information code is stored in advance in a memory unit employed in the control means 1. It should be noted that all or only some portions of the position-information decoding program can be stored in an external storage medium such as a CD-ROM. Then, when necessary, the position-information decoding program is read out from the external storage medium by using a playback apparatus and executed for carrying out processing to decode a position-information code represented by a string of codes into the original information on a position including the latitude and the longitude of the position. By storing a position-information decoding program in an external storage medium as described above, the first embodiment allows the position-information decoding program to be replaced with ease, exhibiting an effect that replacement of a bad portion of the program by a good one or replacement of an old portion by a new version can be carried out with ease.

In the first embodiment, as described above, a position-information code always includes a latitude and a longitude as described above. It should be noted that, in place of a latitude and a longitude, a position-information code may include any other information on a point not stored as map data in the map-information storage means 2 as long as the information can be used for identifying the position of the point.

Second Embodiment

The following is a description of a position-information-code creating apparatus for a navigation system implemented by a second embodiment of the present invention.

Figure 10:
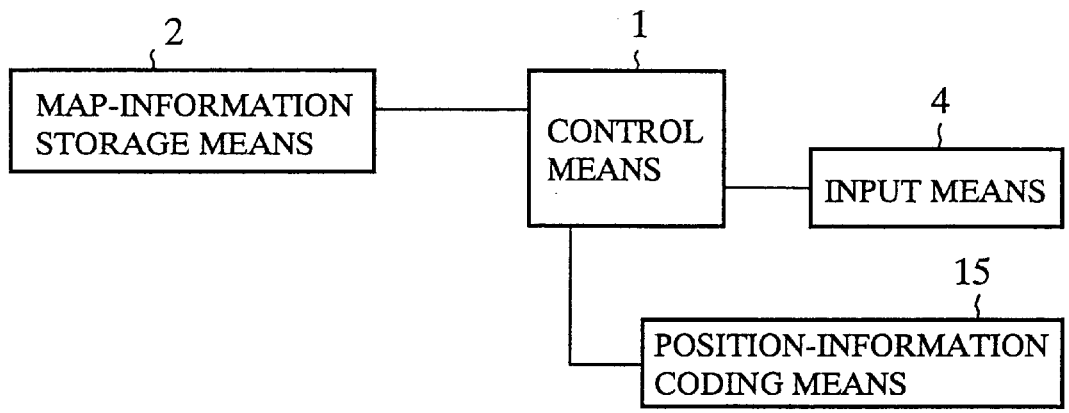
FIG. 10 is a block diagram showing a functional configuration of a navigation system employing a navigation-system position-information-code creating apparatus provided by a second embodiment of the present invention.

FIG. 10 is a block diagram showing a functional configuration of a navigational system employing a navigation-system position-information-code creating apparatus provided by the second embodiment. In the figure, reference numeral 15 denotes a position-information coding means for generating a string of codes such as a string of numbers representing a position-information code from information on a position such as the latitude and the longitude of the position. Other components employed in the configuration identical with those shown in FIG. 1 are denoted by the same reference numerals as those used in FIG. 1 and their explanation is omitted. It should be noted that only portions of the configuration required in the explanation of the second embodiment are shown in FIG. 10. In other words, portions of the configuration that are not required in the explanation of the second embodiment are not shown in FIG. 10.

The principle of operation of the position-information-code creating apparatus for a navigation system implemented by the second embodiment is explained as follows.

Information on a position including the latitude and the longitude of the position entered by the user via the input means 4 is supplied to the position-information coding means 15 under control executed by the control means 1. The position-information coding means 15 splits the latitude of the information on a position supplied thereto into three numbers representing portions of the latitude expressed in terms of degrees, minutes and seconds respectively. Similarly, the longitude is split into three numbers representing portions thereof expressed in terms of degrees, minutes and seconds respectively. The numbers resulting from the splitting of the latitude and the longitude are used to form a position-information code.

The numbers representing portions of the latitude and the longitude expressed in terms of degrees, minutes and seconds are used for forming a position-information code by using the following algorithm. Let notation Ncode be a string of codes representing a position-information code, the latitude of the position be xd degrees, xm minutes and xs seconds North and the longitude of the position be yd degrees, ym minutes and ys seconds East. In this case, the position-information code Ncode is formed from xd [expressed in terms of degrees], xm [expressed in terms of minutes] and xs [expressed in terms of seconds] of the latitude, and yd [expressed in terms of degrees], ym [expressed in terms of minutes] and ys [expressed in terms of seconds] of the longitude by using Eq. 3 given as follows:

$$\text{Ncode}=(xd-xd2)\times xd1+xm\times xm3+xs\times xs1+(yd-yd2)\times yd1+ym\times ym1+ys \quad (3)$$

When the position-information code of a position with a north latitude of 34 degrees, 41 minutes and 49 seconds and an east longitude of 135 degrees, 29 minutes and 56 seconds is formed, the following values are substituted for xd1, xd2, xm3, xs1, yd1, yd2 and ym1 of Eq. 3: xd1=1010, xd2=30, xm3=108, xs1=106, yd1=104, yd2=100 and ym1=102 to result in Eq. 4 as follows:

$$\text{Ncode}=(xd-30)\times 1010+xm\times 106+xs\times 106\times +(yd-100)\times 104+ym\times 102+ys \quad (4)$$

By using Eq. 4, the latitude and longitude of the point are coded into a position-information code Ncode= 044149352956.

In this way, the second embodiment allows a set point to be represented by a simple expression and formats to be made uniform with ease. In addition, not only does it become possible to use information on a position generated in the navigation system used by the user in another navigation system and another system requiring the information on a position besides the navigation system used by the user, but there is also provided an effect that a position can be set without depending on information stored in the map-information storage means 2. Further, there is also provided an effect that it is now possible to tell, for example, a meeting place to a partner and notify a visitor of the place of the user's home or the user's company by means of media such as distributable postcards, name cards or pamphlets for the sake of the visitor's convenience.

As described above, in the second embodiment, a position-information coding program for generating a position-information code from information on a position is stored in advance in a memory unit employed in the control means 1. It should be noted that all or only some portions of the position-information coding program can be stored in an external storage medium such as a CD-ROM. Then, when necessary, the position-information coding program is read out from the external storage medium by using a playback apparatus and executed for carrying out processing to code the original information on a position including the latitude and the longitude of the position into a position-information code represented by a string of codes.

By storing a position-information coding program in an external storage medium as described above, the second embodiment allows the position-information coding program to be replaced with ease, exhibiting an effect that replacement of a bad portion of the program by a good one or replacement of an old portion by a new version can be carried out with ease.

Third Embodiment

An information presenting system implemented by a third embodiment of the present invention is described as follows.

Figure 11:
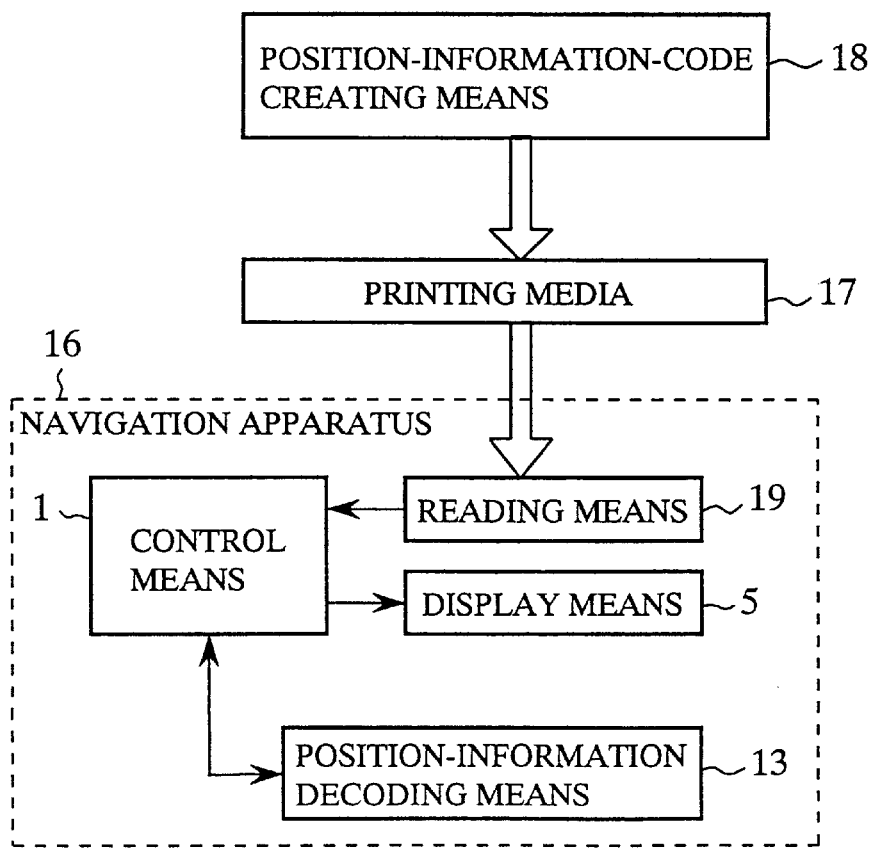
FIG. 11 is a block diagram showing an information presenting system implemented by a third embodiment of the present invention.

FIG. 11 is a block diagram showing an information presenting system implemented by a third embodiment of the present invention. In the figure, reference numeral 16 denotes a navigation apparatus for presenting the user with information created by using information on a position including the latitude and the longitude of the position resulting from decoding of a string of codes representing a position-information code. Reference numeral 17 is printing media such as a leaflet, a magazine or a name card on which a position-information code is printed. Reference numeral 18 is a position-information-code creating apparatus identical with the one implemented by the second embodiment described above. The position-information-code creating apparatus 18 is used for creating a position-information code to be printed on the printing media 17. The navigation apparatus 16 includes a reading means 19 such as an OCR (Optical Character Reader) or a bar-code reading device for reading out a position-information code printed on the printing media 17. Other components are identical with those shown in FIG. 1 and denoted by the same reference numerals as those used in FIG. 1. The explanation of the identical components is omitted. It should be noted that only portions of the configuration required in the explanation of the third embodiment are shown in FIG. 11. In other words, portions of the configuration that are not required in the explanation of the third embodiment are not shown in FIG. 11.

Figure 12:
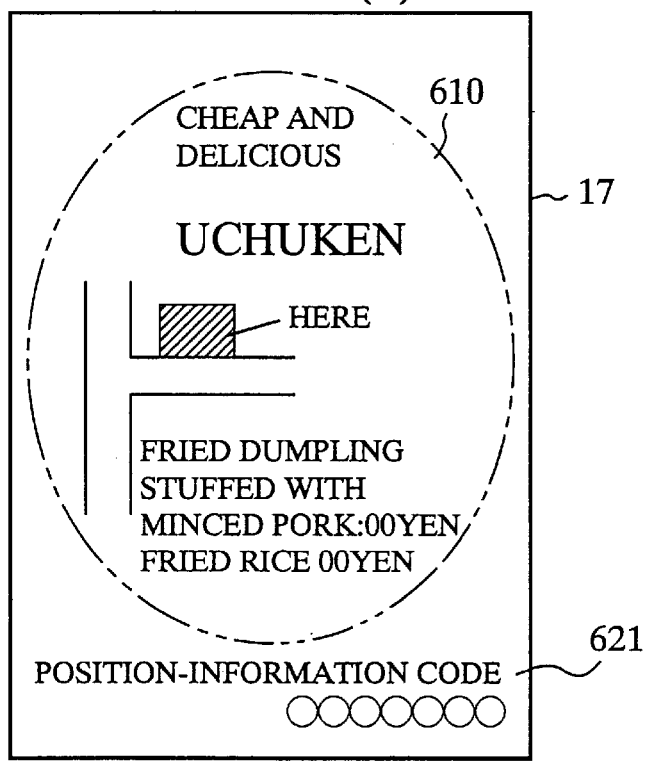
FIGS. 12A and 12B are each an explanatory diagram showing an example of printing printed on printing media produced by the information presenting system implemented by the third embodiment.
Figure 12:
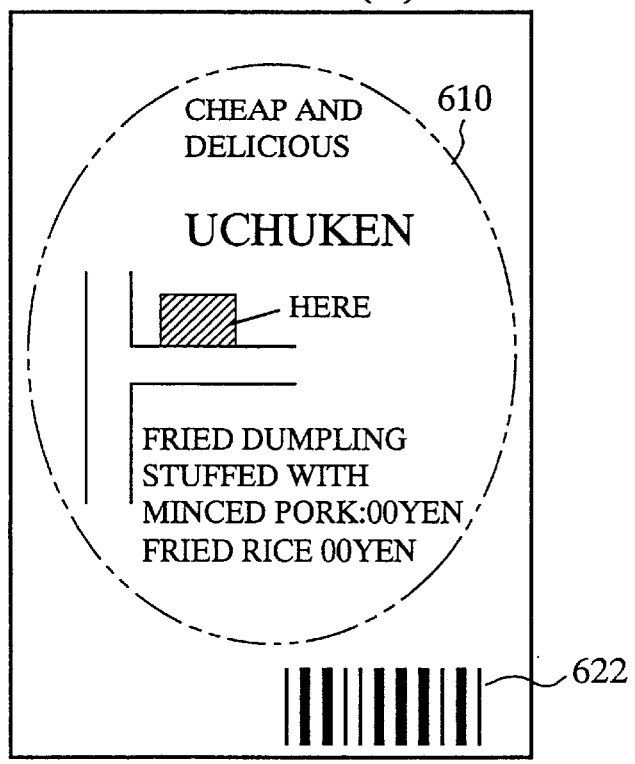

FIGS. 12A and 12B are each an explanatory diagram showing an example of printing printed on the printing media 17 produced by the information presenting system implemented by the third embodiment. The example shown in FIG. 12A is a printed string of numbers representing a position-information code and that shown in FIG. 12B is a bar code of a position-information code. Reference numeral 610 shown in the figure denotes presented information on a store printed on the printing media 17 such as an ordinary leaflet or a magazine and reference numeral 621 is the position-information code printed on the printing media 17 by the position-information creating apparatus 18 as a string of codes. Likewise, reference numeral 622 is the position-information code printed on the printing media 17 by the position-information creating apparatus 18 as a bar code.

The principle of operation of the information presenting system implemented by the third embodiment is described as follows.

Figure 13:
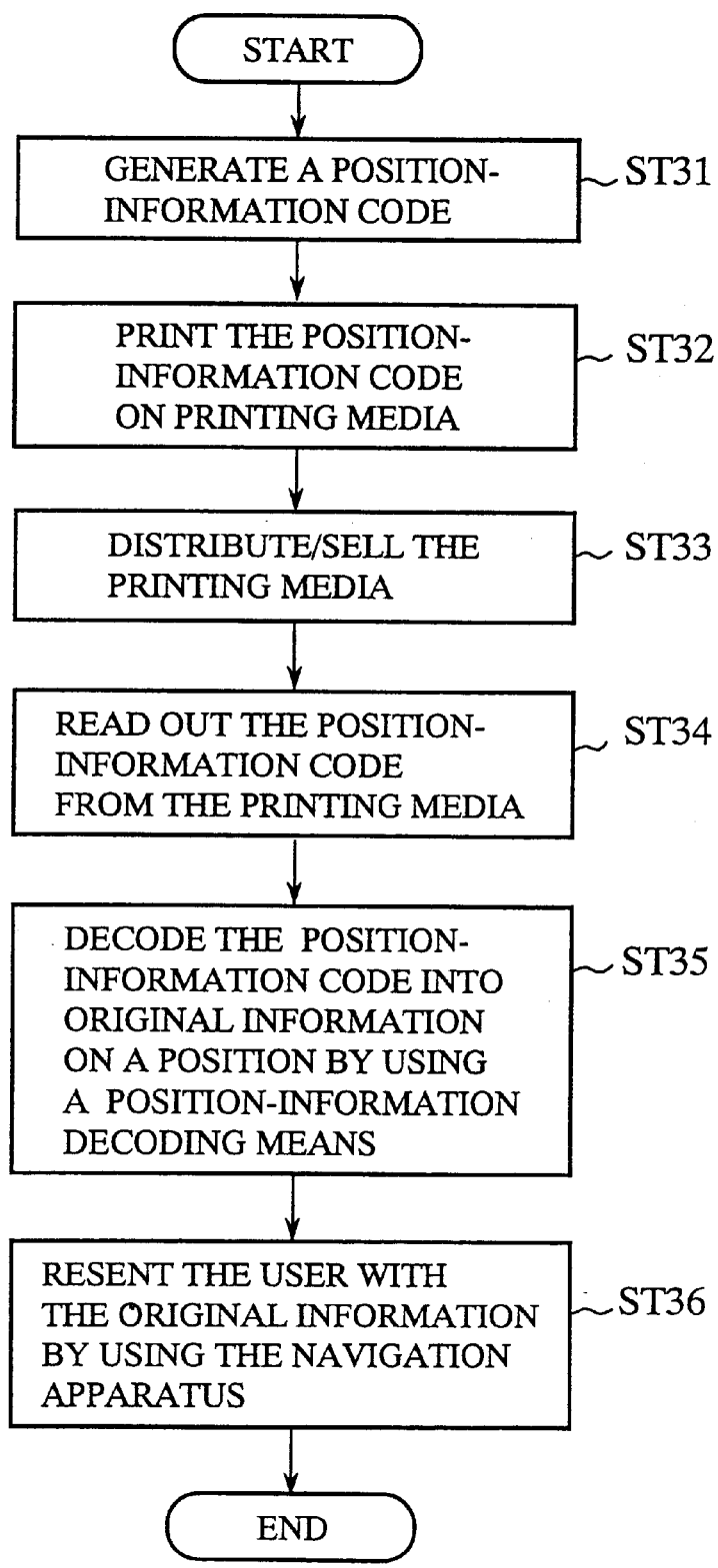
FIG. 13 is a flowchart showing operations carried out by the information presenting system implemented by the third embodiment.

FIG. 13 is a flowchart showing operations carried out by the information presenting system implemented by the third embodiment. As shown in the figure, the flowchart begins with a step ST31 at which a position-information code is created by the position-information-code creating apparatus 18 implemented by the second embodiment described earlier. Then, the flow goes on to a step ST32 at which the position-information code created at the step ST31 is printed on the printing media 17 such as a leaflet, a magazine or a name card as a string of numbers 621 or a bar code 622. The flow then goes on to a step ST33 at which the printing media 17 such as leaflets, magazines or name cards on which the string of numbers 621 or the bar code 622 representing the position-information code was printed are distributed or sold.

Subsequently, the flow continues to a step ST34 at which the user who receives the distributed or sold printing media 17 such as a leaflet, a magazine or a name card reads out the string of numbers 621 or the bar code 622 representing the position-information code from the printing media 17 by using the reading means 19 employed in the navigation apparatus 16. Then, the flow goes on to a step ST35 at which the navigation apparatus 16 transmits the position-information code read out by the reading means 19 to the position-information decoding means 13 for decoding the position-information code into the original information on the position. The flow then proceeds to a step ST36 at which the original information on the position resulting from the decoding of the position-information code is converted into information displayed on the display means 5 to the user.

Instead of using the reading means 19, the user can manually enter the string of numbers 621 printed on the printing media 17 by typically pressing the ten numeric keys.

As described above, according to the third embodiment, the position of a desired facility can be entered to the navigation apparatus in an easy as well as simple way by using a position-information code printed on printing media such as a leaflet, magazine or name card, giving rise to an effect of exciting the user's will to use the facility, one of effects of advertisement that can be expected. In addition, since the position-information code is merely printed on paper or the like, there is also exhibited an effect that the printing media can be produced in volume. Further, since a minor modification of the specifications of the conventional navigation apparatus is sufficient to make the information presenting system implemented by the third embodiment work, it is possible to reduce an increase in price of the navigation system.

The position-information code is printed on the printing media in this embodiment, but the code may be transmitted as a form of a radio wave such as FM multiplex broadcasting. In such a broadcasting, the amount of transmitting data is small, because the data is coded.

Furthermore, it may be realized that the position-information code is utilized in communication in a worldwide area by connecting the position-information code creating apparatus with a network such as the Internet via a communication circuit such as a telephone circuit. In particular, standardization can be easy by using the position-information code as a worldwide standard.

It is further understood by those skilled in the art that what is described above is no more than description of preferred embodiments of the disclosed systems, apparatuses and printing media provided by the present invention and that a variety of changes and modifications may thus be made to the foregoing embodiments without departing from the true spirit and the scope of the claims of present invention which are appended as follows.

What is claimed is:

1. A method of navigating including:

storing map data within a navigation device;

detecting a present position of a moving body relative to said map data;

inputting into said navigation device a position-information code associated by a predetermined algorithm with encoded original position information of a desired location including but not limited to a latitude and a longitude of said desired location, the algorithm being dependent on a type of the original position information;

decoding said position-information code to obtain said original position information; and presenting a user with said original position information relative to said map data and said present position.

2. The method of navigating according to claim 1, further comprising:

setting a route between said present position and said desired location on said map data; and quantizing said route into a simplified figure revealing characteristics of said route on the basis of a relation between said present position and a point of intersection closest to said present position as an object of guidance on said route.

3. The method of navigating according to claim 1, further comprising:

including a code for detecting an error within said position-information code.

4. The method of navigating according to claim 1, further comprising:

setting a route between two points on said map data; and including condition data of a route search within said position information code.

5. The method of navigation according to claim 1, further comprising:

including facility information within said position information code.

6. The method of navigating according to claim 1, further comprising:

setting a route between two points on said map data; and including within said position information code a latitude and longitude of a location of a parking place related to said desired location or a parking place in close proximity to said facility.

7. The method of navigating according to claim 1, further comprising:

including within said position information code latitudes and longitudes of a plurality of locations.

8. The method of navigating according to claim 1, further comprising:

storing a position-information decoding program in advance in an external storage device for decoding said position-information code into said original position information; and decoding said position-information code into said original position information using said position-information decoding program.

9. A method for creating position-information codes for a method of navigating comprising:

encoding original position information of a desired location including but not limited to a latitude and a longitude of said desired location into a string of codes representing position-information codes associated by a predetermined algorithm with the original position information, the algorithm being dependent on a type of the original position information.

10. The method for creating position-information codes for a method of navigating as claimed in claim 9, further comprising:

storing a position-information coding program for performing said encoding in advance in an external storage device;

loading said position-information coding program from said external storage device into a position-information-code creating apparatus; and processing said encoding by executing said position-information coding program within said position-information-code creating apparatus.

11. A method for presenting navigation information comprising:

reading out a position-information code from printing media on which said position-information code was printed, wherein said position-information code is associated by a predetermined algorithm with encoded original position information of a desired location including but not limited to a latitude and a longitude of said desired location, the algorithm being dependent on a type of the original position information.

12. The method for presenting navigation information as claimed in claim 11, further comprising:

displaying said information created from said original position information.

13. A method for printing a string of characters or a bar code representing a position-information code, comprising:

generating a position-information code associated by a predetermined algorithm with encoded original position information of a desired location including but not limited to a latitude and a longitude of said desired location, the algorithm being dependent on a type of the original position information;

representing said position-information code as a string of characters or a bar code; and printing said string of characters or said bar code.

* * * * *